(12) United States Patent
Nunome et al.

(10) Patent No.: US 11,336,395 B2
(45) Date of Patent: May 17, 2022

(54) TERMINAL AND COMMUNICATION METHOD

(71) Applicant: Panasonic Intellectual Property Corporation of America, Torrance, CA (US)

(72) Inventors: Tomoya Nunome, Ishikawa (JP); Hidetoshi Suzuki, Kanagawa (JP); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 188 days.

(21) Appl. No.: 16/636,243

(22) PCT Filed: Aug. 18, 2017

(86) PCT No.: PCT/CN2017/097987
§ 371 (c)(1),
(2) Date: Feb. 3, 2020

(87) PCT Pub. No.: WO2019/033384
PCT Pub. Date: Feb. 21, 2019

(65) Prior Publication Data
US 2020/0252165 A1 Aug. 6, 2020

(51) Int. Cl.
*H04W 72/04* (2009.01)
*H04L 1/16* (2006.01)
(Continued)

(52) U.S. Cl.
CPC .......... *H04L 1/1607* (2013.01); *H04L 1/1812* (2013.01); *H04L 5/0055* (2013.01); *H04L 5/14* (2013.01); *H04W 72/042* (2013.01)

(58) Field of Classification Search
CPC ......... H04L 5/14; H04L 1/607; H04L 5/0055; H04L 1/1812; H04L 1/18; H04W 72/04; H04W 72/042
See application file for complete search history.

(56) References Cited

U.S. PATENT DOCUMENTS

2018/0332568 A1\* 11/2018 Wu .................. H04L 1/1896
2019/0020445 A1\* 1/2019 Kim ................. H04L 1/0071
(Continued)

FOREIGN PATENT DOCUMENTS

WO 2017/087357 A1 5/2017

OTHER PUBLICATIONS

3GPP TS 36.213 V14.2.0, "3rd Generation Partnership Project; Technical Specification Group Radio Access Network; Evolved Universal Terrestrial Radio Access (E-UTRA); Physical layer procedures (Release 14)," Mar. 2017, 454 pages.
(Continued)

*Primary Examiner* — Chi Ho A Lee
*Assistant Examiner* — Andrew Lee
(74) *Attorney, Agent, or Firm* — Seed IP Law Group LLP

(57) ABSTRACT

In a terminal (200), a HARQ-ACK generator (208) generates one or more response signals for respective code block groups based on a parameter included in each of a plurality of downlink control signals, the code block groups forming each of a plurality of transport blocks to be assigned by the plurality of downlink control signals, the parameter relating to the number of code block groups. A transmitter (211) collectively transmits the response signals for the respective code block groups. A value of the parameter herein is to be configured, at least using a first granularity coarser than a second granularity in units of the code block groups.

9 Claims, 12 Drawing Sheets

(51) Int. Cl.
*H04L 1/18* (2006.01)
*H04L 5/00* (2006.01)
*H04L 5/14* (2006.01)

(56) References Cited

U.S. PATENT DOCUMENTS

| | | | |
|---|---|---|---|
| 2019/0021088 A1* | 1/2019 | Zhang | H04W 72/12 |
| 2019/0181986 A1* | 6/2019 | Kitamura | H04L 1/1819 |
| 2019/0191486 A1* | 6/2019 | Myung | H04W 76/27 |
| 2019/0207734 A1* | 7/2019 | Yang | H04L 1/1864 |
| 2019/0288804 A1* | 9/2019 | Jiang | H04L 1/20 |
| 2020/0059327 A1* | 2/2020 | Kini | H04W 72/042 |
| 2020/0112403 A1* | 4/2020 | Liu | H04L 5/0055 |
| 2020/0153563 A1* | 5/2020 | Kim | H04L 5/0055 |
| 2020/0295878 A1* | 9/2020 | Choi | H04W 72/1273 |
| 2020/0328848 A1* | 10/2020 | He | H04L 1/1854 |
| 2021/0126759 A1* | 4/2021 | Chen | H04L 5/0048 |

OTHER PUBLICATIONS

International Search Report, dated Apr. 18, 2018, for corresponding International Application No. PCT/CN2017/097987, 2 pages.
NTT Docomo, "Revision of SI: Study on New Radio Access Technology," RP-161596 (revision of RP-161214), Agenda Item: 9.2.2, 3GPP TSG RAN Meeting #73, New Orleans, Sep. 19-22, 2016, 7 pages.

* cited by examiner

| DAI index | DAI value |
|---|---|
| 00000 | 1 or 33 or ... |
| 0001 | 2 or 34 or ... |
| 00010 | 3 or 35 or ... |
| 00011 | 4 or 36 or ... |
| 00100 | 5 or 37 or ... |
| 00101 | 6 or 38 or ... |
| 00110 | 7 or 39 or ... |
| 00111 | 8 or 40 or ... |
| ⋮ | ⋮ |
| 11111 | 0 or 32 or ... |

FIG. 6

| DAI index | DAI value |
|---|---|
| 000 | 4 or 36 or ... |
| 001 | 8 or 40 or ... |
| 010 | 12 or 44 or ... |
| 011 | 16 or 48 or ... |
| 100 | 20 or 52 or ... |
| 101 | 24 or 56 or ... |
| 110 | 28 or 60 or ... |
| 111 | 0 or 32 or ... |

FIG. 7

| DAI index | DAI value |
|---|---|
| 000 | 2 or 36 or ... |
| 001 | 4 or 40 or ... |
| 010 | 6 or 44 or ... |
| 011 | 8 or 48 or ... |
| 100 | 12 or 52 or ... |
| 101 | 20 or 56 or ... |
| 110 | 28 or 60 or ... |
| 111 | 0 or 32 or ... |

FIG. 11

>> Case: slot 1 is 1CBG, slot 2 is 2CBGs, slot 3 is 4CBGs, slot 4 is 2 CBGs

>> Config. 1: Granularity of DAI is 4 (DAI: 3 bit)
    >> The number of HARQ-ACK bit is 16

>> Config. 2: Embodiment 3 (DAI: 3 bit)
    >> The number of HARQ-ACK bit is 12

>> Case: slot 1 is 1CBG, slot 2 is 2CBGs, slot 3 is 4CBGs, slot 4 is 2 CBGs

>> Config. 3: Granularity of counter/total DAI is 4 (each DAI is 3 bit)
  >> The number of HARQ-ACK bit is 16

>> Config. 4: Granularity of counter DAI is 2 (4 bit) and granularity of total DAI is 4 ( 3bit)
  >> The number of HARQ-ACK bit is 12
    (reducing 4 bits compared to Config. 3 instead of 1 bit increase of DAI)

TERMINAL AND COMMUNICATION METHOD

TECHNICAL FIELD

The present disclosure relates to a terminal and a communication method.

BACKGROUND ART

A communication system so called the fifth generation mobile communication system (5G) has been under study. In 5G, studies have been conducted on flexibly providing functions respectively for use cases where communication traffic increases, where the number of terminals to be connected increases, and where high reliability and/or low latency is required. There are three representative use cases, which are enhanced Mobile Broadband (eMBB), massive Machine Type Communications (mMTC), and Ultra Reliable and Low Latency Communications (URLLC). The 3rd Generation Partnership Project (3GPP), which is an international standardization organization, has been conducting studies on further evolution of the communication system from both aspects of further evolution of the LTE systems and New Radio Access Technology (RAT) (see, e.g., Non-Patent Literature (hereinafter, referred to as "NPL") 1).

In LTE, retransmission control is performed for each Transport Block (TB) in a Hybrid Automatic Repeat Request (HARQ) for downlink (DL) data. More specifically, when a base station (may be referred to as "eNB") transmits DL data to a terminal (may be referred to as "User Equipment (UE)"), the terminal generates a 1-bit HARQ-ACK bit (response signal) per TB and transmits the HARQ-ACK bit to the base station. In Time Division Duplex (TDD), for example, a terminal may generate a 1-bit HARQ-ACK bit for each plurality of TBs.

CITATION LIST

Non-Patent Literature

NPL 1
RP-161596, "Revision of SI: Study on New Radio Access Technology," NTT DOCOMO, September 2016
NPL 2
3GPP TS 36.213 V14.2.0, "Physical layer procedures (Release 14)," March 2017

SUMMARY OF INVENTION

In New RAT, retransmission control for each Code Block Group (CBG) has been studied. CBGs are each formed by grouping one or more Code Blocks (CBs), and a TB is composed of at least one CBG. No sufficient studies, however, have been carried out on a retransmission control method for each CBG in New RAT.

One non-limiting and exemplary embodiment of this disclosure facilitates providing a terminal and a communication method each capable of appropriately performing retransmission control for each CBG A terminal according to an aspect of the present disclosure includes: circuitry, which, in operation, generates one or more response signals for respective code block groups based on a parameter included in each of a plurality of downlink control signals, the code block groups forming each of a plurality of transport blocks to be assigned by the plurality of downlink control signals, the parameter relating to the number of the code block groups; and a transmitter, which in operation, collectively transmits the response signals for the respective code block groups, in which a value of the parameter is to be configured, at least using a first granularity coarser than a second granularity in units of the code block groups.

A communication method according to an aspect of the present disclosure includes: generating one or more response signals for respective code block groups based on a parameter included in each of a plurality of downlink control signals, the code block groups forming each of a plurality of transport blocks to be assigned by the plurality of downlink control signals, the parameter relating to the number of the code block groups; and collectively transmitting the response signals for the respective code block groups, in which a value of the parameter is to be configured, at least using a first granularity coarser than a second granularity in units of the code block groups.

Note that the comprehensive or specific aspects mentioned above may be implemented by a system, an apparatus, a method, an integrated circuit, a computer program or a recoding medium, or any combination of the system, the apparatus, the method, the integrated circuit, the computer program, and the recoding medium.

According to an aspect of this disclosure, retransmission control for each CBG can be appropriately performed.

The specification and the drawings make it clear more advantages and effects in an aspect of this disclosure. Such advantages and/or effects are provided by the features disclosed in some embodiments as well as the specification and the drawings, but all of them do not have to be provided in order to obtain one or more identical features.

BRIEF DESCRIPTION OF DRAWINGS

FIG. 6 is a table illustrating an example of Downlink Assignment Index (DAI) of Granularity 1 according to Embodiment 1;

FIG. 7 is a table illustrating an example of a DAI of Granularity 4 according to Embodiment 1;

FIG. 11 is a table illustrating an example of a DAI according to Embodiment 3;

DESCRIPTION OF EMBODIMENTS

Hereinafter, a detailed description will be given of embodiments of the present disclosure with reference to the accompanying drawings.

In a case where a terminal fails to receive Downlink Control Information (DCI) due to a decoding error (hereinafter, referred to as "DCI decoding error") although a base station has transmitted a DCI along with transmission of DL data, the terminal does not know the presence of the DL data directed to the terminal. In such case, the terminal transmits no HARQ-ACK when configured to perform a single HARQ-ACK transmission per DCI reception. The base station can know that a DCI decoding error has occurred in the terminal by recognizing that the terminal has transmitted no HARQ-ACK.

Meanwhile, when configured to perform a single HARQ-ACK transmission per plurality of times of DCI reception, the terminal transmits, to a base station, even in a case where a DCI decoding error has occurred for certain DL data, a HARQ-ACK bit sequence generated based on a reception result of DL data other than the certain DL data. In this case, there is a possibility that the reception state of the terminal is not correctly communicated to the base station due to occurrence of a case attributable to the DCI decoding error, where the understanding of the number of bits of a HARQ-ACK bit sequence to be generated may differ between the base station and the terminal and/or where an ACK may be transmitted although a DTX or NACK should have been sent actually.

In this respect, in LTE, a Downlink Assignment Index (DAI) is used as control information (parameter) for allowing a terminal to determine that a DCI decoding error has occurred. The cases where a DAI is used include a case where a terminal transmits a plurality of HARQ-ACKs collectively. Examples of the cases where a terminal transmits a plurality of HARQ-ACKs collectively include TDD or a case where carrier aggregation (CA) is applied.

Hereinafter, HARQ-ACK transmission processing in a case where CA is applied will be described as an example.

Enhanced CA (eCA) of Release 13 employs a system in which mapping of a HARQ-ACK bit sequence and a HARQ-ACK codebook size are determined by "counter DAI" and "total DAI." The term "bundling window" is used herein to indicate the range for collectively transmitting HARQ-ACKs.

The counter DAI and total DAI mentioned above represent the following contents, respectively.

Counter DAI: Cumulative number of PDSCH transmissions (DL assignment transmissions) in a bundling window.

Total DAI: Total number of PDSCH transmissions (DL assignment transmissions) in a bundling window.

In LTE, although the counter DAI and total DAI are each represented by 2 bits, a number greater or equal to four is also countable. This configuration is based on the assumption that the possibility of failing DCI reception in a terminal four consecutive times is sufficiently low.

Figure 1:
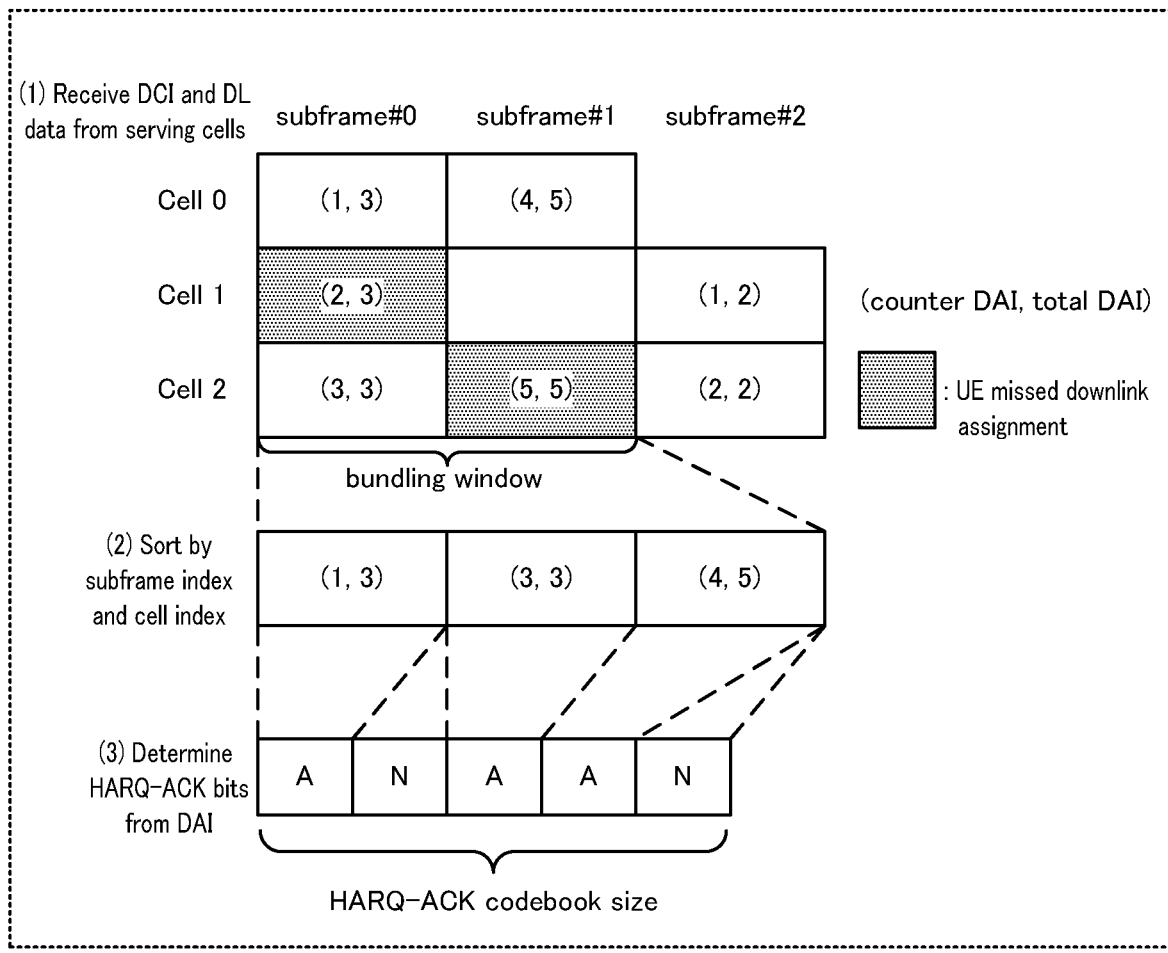
FIG. 1 is a diagram illustrating an example of HARQ-ACK transmission processing in a case where carrier aggregation (CA) is applied.

FIG. 1 illustrates an example of how DAIS are used in eCA of Release 13. In FIG. 1, CA by three cells (Cells 0, 1, and 2) is applied to a terminal, as an example.

As illustrated in FIG. 1, when receiving Downlink Control Information (DCI) and DL data from a base station (serving cell) (at the time of DL reception), the terminal receives a counter DAI and a total DAI in each subframe of each cell.

The terminal determines a HARQ-ACK bit based on the counter DAI and total DAI. In FIG. 1, for example, a DCI decoding error has occurred in subframe #0 of Cell 1 and subframe #1 of Cell 2. Meanwhile, since the terminal has successfully received DAIS in other resources (subframes #0 in Cells 0 and 2 and subframe #1 in Cell 0) in a bundling window, the terminal can know that the number of PDSCH transmissions (DL assignment transmissions) in the bundling window is five and that the terminal has received the first, the third, and the fourth PDSCH transmissions. In other words, the terminal determines that a DCI decoding error has occurred once in each of subframes #0 and #1 and generates NACKs as HARQ-ACKs for the second and the fifth PDSCH transmissions. Thus, the terminal can correctly inform the base station of the reception state of the terminal.

Note that, although the term "counter DAI/total DAI" refer to a 2-bit value ($V^{DL}_{C-DAI, c, k}$ and $V^{DL}_{C-DAI, co}$ in FDD, and $V^{DL}_{C-DAI, c, k}$ and $V^{DL}_{T-DAI, k}$ in TDD) in NPL 2, for simplification of description, the term "counter DAI/total DAI" respectively refer to a cumulative number of DL assignment transmissions and a total number of DL assignment transmissions. Moreover, the values to be actually signaled for the counter DAI/total DAI are subject to modulo 4, in order to avoid complicating the description, values without modulo 4 are used for the description, hereinafter.

Hereinabove, a description has been given of an example of a HARQ-ACK transmission in a case where CA is applied in LTE.

In New RAT, as described above, transmitting a HARQ-ACK for each CBG from a terminal has been under study. For this reason, an assumption is made that DAIS are also configured in units of CBG transmissions (e.g., a cumulative number and a total number of CBG transmissions) (CBG-level DAIS). In a case where CBG-level DAIS are used, however, the amount of information of DAIS increases, causing an increase in the DCI overhead.

In this respect, hereinafter, a description will be given of a method capable of performing retransmission control for each CBG while suppressing an increase in the DCI overhead.

Summary of Communication System

A communication system according to each embodiment of the present disclosure includes base station 100 (gNB) and terminal 200 (UE).

Figure 2:
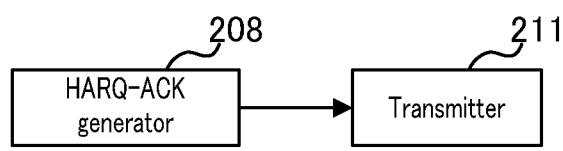
FIG. 2 is a block diagram illustrating part of a configuration of a terminal according to Embodiment 1.

FIG. 2 is a block diagram illustrating part of a configuration of terminal 200 according to an aspect of the present disclosure. In terminal 200 illustrated in FIG. 2, HARQ-ACK generator 208 generates one or more response signals (HARQ-ACKs) for respective code block groups (CBGs) based on a parameter included in each of a plurality of downlink (DL) control signals (DCIS), the CBGs forming each of a plurality of transport blocks (TBs) to be assigned by the plurality of DL control signals, the parameter (DAI) relating to the number of CBGs. Transmitter 211 collectively transmits the response signals for the respective code block groups. The value of the parameter (DAI) is configured, at least using a granularity coarser than a granularity in units of the code block groups.

Configuration of Base Station

Figure 3:
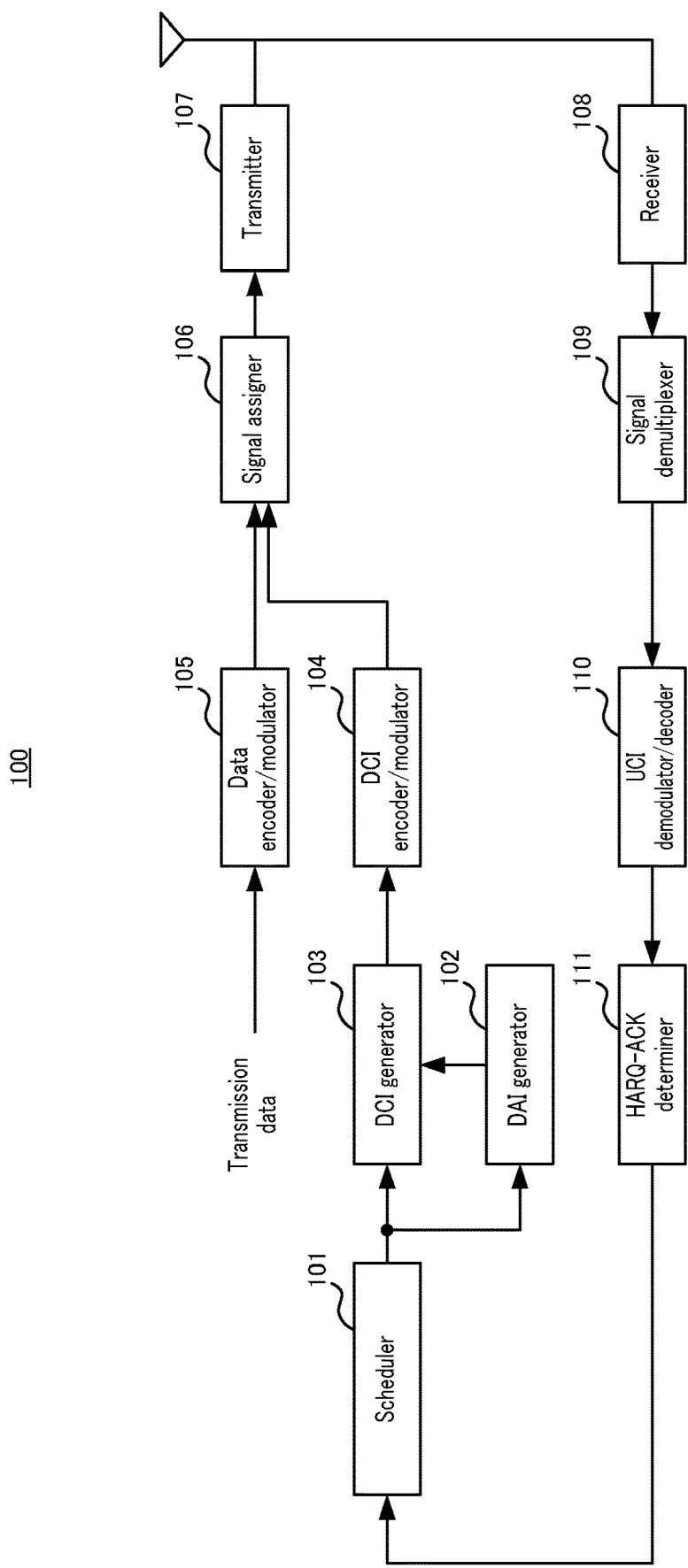
FIG. 3 is a block diagram illustrating a configuration of a base station according to Embodiment 1.

FIG. 3 is a block diagram illustrating a configuration of base station 100 according to Embodiment 1. In FIG. 3, base station 100 includes scheduler 101, DAI generator 102, DCI generator 103, DCI encoder and/or modulator 104, data encoder and/or modulator 105, signal assigner 106, transmitter 107, receiver 108, signal demultiplexer 109, UCI demodulator and/or decoder 110, and HARQ-ACK determiner 111.

Scheduler 101 performs scheduling for terminal 200, using a determination result to be inputted from HARQ-ACK determiner 111, and outputs scheduling information indicating a scheduling result to DAI generator 102 and DCI generator 103. The scheduling information contains information on a transmission-destination terminal for DL data and information on a CBG of transmission data (such as CBG number, and/or the number of CBGs).

DAI generator 102 generates a DAI (e.g., counter DAI or total DAI) based on the scheduling information to be inputted from scheduler 101. DAI generator 102 may calculate each of a counter DAI and a total DAI from the number of pieces of passed DL data in a bundling window, for example. DAI generator 102 outputs DAI information indicating the generated DCI to DCI generator 103. Note that, the definition(s) of the counter DAI and/or total DAI may be based on the definitions disclosed in NPL 2.

DCI generator 103 generates a bit sequence (DCI bit sequence) of a control signal (e.g., DL assignment) indicating a resource to which DL data is assigned, based on the scheduling information to be inputted from scheduler 101 and the DAI information to be inputted from DAI generator 102. A DCI contains, for example, information on a CBG number and the number of CBGs. DCI generator 103 outputs a DCI bit sequence to DCI encoder/modulator 104.

DCI encoder/modulator 104 applies error correction coding to the DCI bit sequence to be inputted from DCI generator 103, then modulates the coded signal and outputs the modulated signal (symbol sequence) to signal assigner 106.

Data encoder and/or modulator 105 applies error correction coding to a bit sequence of transmission data (DL data) to be inputted, then modulates the coded signal and outputs the modulated signal (symbol sequence) to signal assigner 106. Note that, the transmission data may contain higher-layer (e.g., Radio Resource Control (RRC)) signaling.

Signal assigner 106 assigns, to a downlink (DL) resource (e.g., time and/or frequency resource), the symbol sequence (DCI) to be inputted from DCI encoder/modulator 104 and the symbol sequence (DL data) to be inputted from data encoder/modulator 105. Note that, transmission waveform generation, such as Orthogonal Frequency Division Multiplexing (OFDM), is applied to a transmission signal (not illustrated). Thus, a transmission signal containing a DCI or DL data is formed. The transmission signal thus formed is outputted to transmitter 107.

Transmitter 107 applies radio transmission processing, such as up-conversion, to the transmission signal to be inputted from signal assigner 106, and transmits the signal to terminal 200 via an antenna.

Receiver 108 receives, via an antenna, a signal transmitted from terminal 200, then applies radio transmission processing, such as down-conversion, to a received signal, and outputs the signal to signal demultiplexer 109.

Signal demultiplexer 109 demultiplexes Uplink Control Information (UCI) from the received signal to be received from receiver 108 and outputs the UCI to UCI demodulator/decoder 110.

UCI demodulator/decoder 110 demodulates and decodes the UCI to be inputted from signal demultiplexer 109 and outputs the decoded UCI to HARQ-ACK determiner 111.

HARQ-ACK determiner 111 determines a HARQ-ACK for DL data contained in the UCI to be inputted from UCI demodulator/decoder 110 and outputs a determination result to scheduler 101.

Configuration of Terminal

Figure 4:
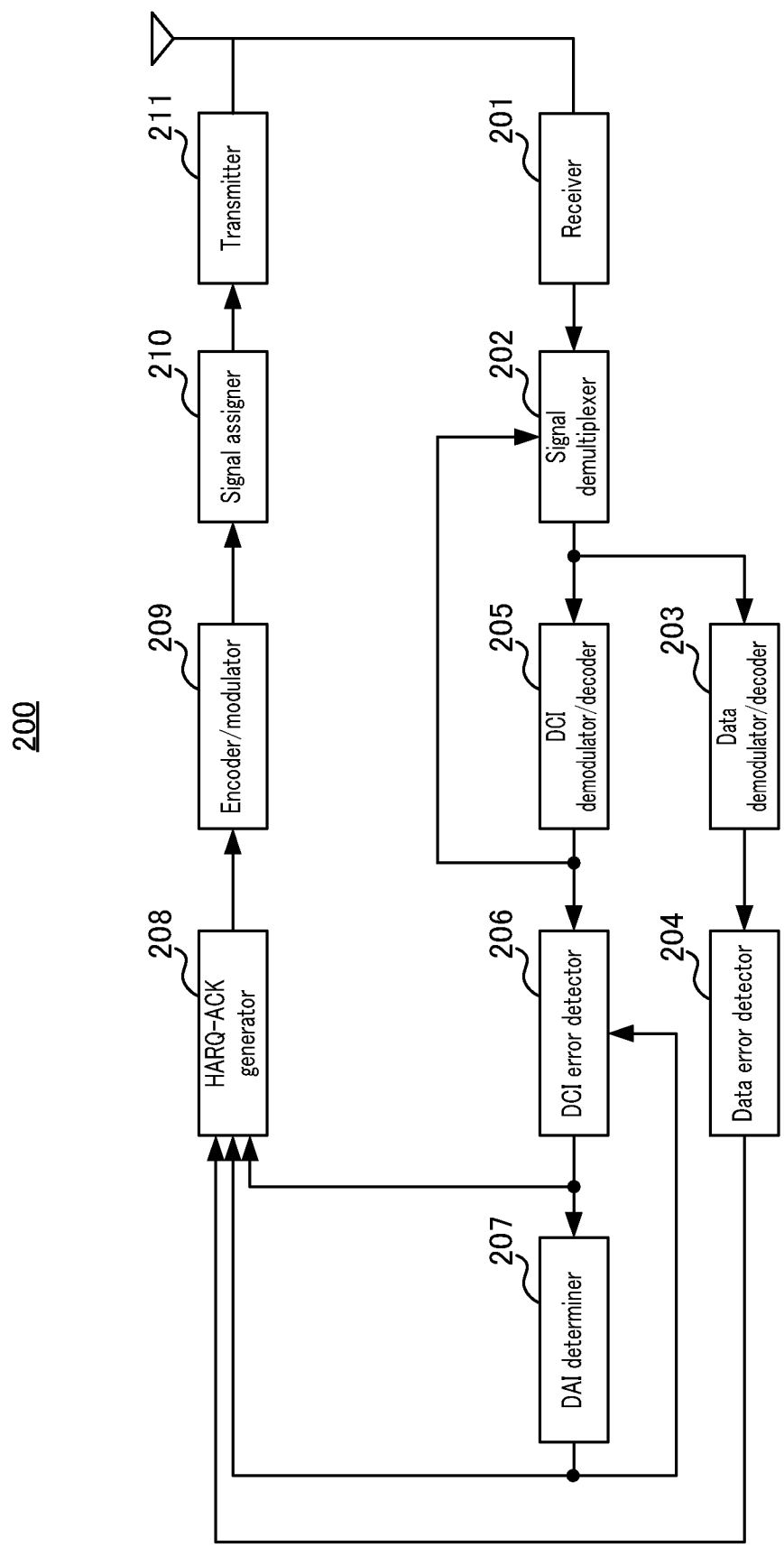
FIG. 4 is a block diagram illustrating the configuration of the terminal according to Embodiment 1.

FIG. 4 is a block diagram illustrating a configuration of terminal 200 according to Embodiment 1. In FIG. 4, receiver 201, signal demultiplexer 202, data demodulator and/or decoder 203, data error detector 204, DCI demodulator and/or decoder 205, DCI error detector 206, DAI determiner 207, HARQ-ACK generator 208, encoder and/or modulator 209, signal assigner 210, and transmitter 211.

Receiver 201 receives, via an antenna, a received signal, then applies radio reception processing, such as down-conversion, to the received signal, and outputs the signal to signal demultiplexer 202.

Signal demultiplexer 202 demultiplexes a DCI from the received signal to be received from receiver 201 and outputs the DCI to DCI demodulator/decoder 205. Signal demultiplexer 202 demultiplexes DL data from the received signal based on DL assignment information (DL assignment) to be inputted from DCI demodulator/decoder 205 and outputs the DL data to data demodulator/decoder 203.

Data demodulator/decoder 203 demodulates and decodes DL data to be inputted from signal demultiplexer 202 and outputs the decoded DL data to data error detector 204.

Data error detector 204 performs error detection on the DL data to be inputted from data demodulator/decoder 203 and outputs an error detection result to HARQ-ACK generator 208. Note that, in a case where DL data is composed of a plurality of CBGs, data error detector 204 outputs error detection results for the respective CBGs to HARQ-ACK generator 208.

DCI demodulator and/or decoder 205 demodulates and decodes the DCI to be inputted from signal demultiplexer 203 and outputs the decoded DCI to signal demultiplexer 202 and DCI error detector 206.

DCI error detector 206 performs error detection on the DCI (e.g., such as determination of the presence or absence of a DCI decoding error) based on the DCI to be inputted from DCI demodulator and/or decoder 205 and the DAI to be inputted from DAI determiner 207, and outputs an error detection result to HARQ-ACK generator 208. When there is no error in the DCI, DCI error detector 206 outputs the DCI to DAI determiner 207.

DAI determiner 207 determines a DAI value (e.g., counter DAI or total DAI) from the DCI to be inputted from DCI error detector 206 and outputs the determined DAI to DCI error detector 206 and HARQ-ACK generator 208. DAI determiner 207 may determine a value(s) of the counter DAI and/or total DAI based on the disclosure of NPL 2.

HARQ-ACK generator 208 generates a HARQ-ACK based on the error detection result to be inputted from data error detector 204, the error detection result to be inputted from DCI error detector 206, and the DAI to be inputted from DAI determiner 207. HARQ-ACK generator 208 outputs the generated HARQ-ACK (bit sequence) to encoder/modulator 209. Note that, the HARQ-ACK bit sequence generation method in HARQ-ACK generator 208 will be described, hereinafter.

Encoder/modulator 209 performs error correction coding and modulation on the HARQ-ACK to be inputted from HARQ-ACK generator 208. Encoder/modulator 209 outputs the modulated HARQ-ACK (symbol sequence) to signal assigner 210.

Signal assigner 210 assigns, to an uplink (UL) resource (e.g., time and/or frequency resource), a UCI containing a HARQ-ACK to be inputted from encoder/modulator 209 and outputs the UCI to transmitter 211. Note that, transmission waveform generation, such as Orthogonal Frequency Division Multiplexing (OFDM), is applied to a transmission signal (not illustrated). Thus, a transmission signal containing the UCI is formed. The transmission signal thus formed is outputted to transmitter 211.

Transmitter 211 applies radio transmission processing, such as up-conversion, to a signal to be inputted from signal assigner 210, and transmits the signal via an antenna.

Operations of Base Station 100 and Terminal 200

Hereinafter, a detailed description will be given of operations of base station 100 and terminal 200 each configured in the manner described above.

Figure 5:
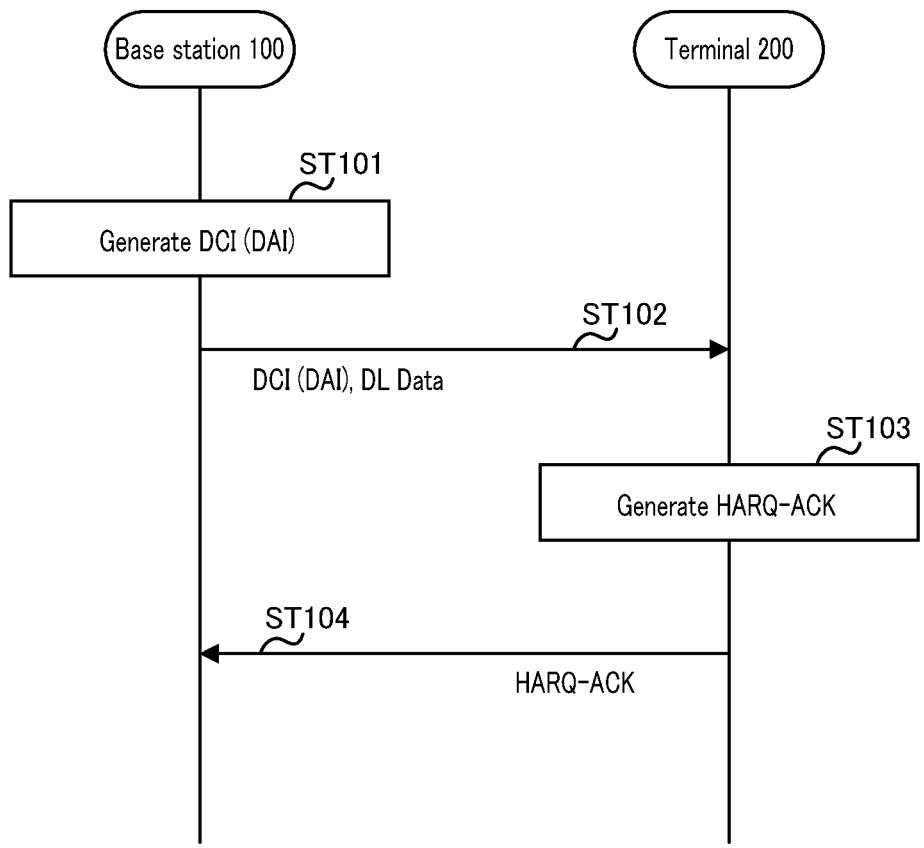
FIG. 5 is a sequence diagram illustrating operation examples of the base station and terminal according to Embodiment 1.

FIG. 5 is a sequence diagram illustrating operations of terminal 100 and base station 200.

Base station 100 generates a DCI containing a DAI (e.g., counter DAI and/or total DAI) for terminal 200 (ST101). Base station 100 transmits the generated DCI and DL data assigned according to this DCI (i.e., DL assignment) to terminal 200 (ST102). As described above, base station 100 indicates, to terminal 200, using a DAI, a cumulative number of CBGs to which DL data for terminal 200 is assigned (counter DAI), and a total number of CBGs contained in a HARQ-ACK bit sequence (total DAI). In Embodiment 1, however, the DAIs to be indicated to terminal 200 from base station 100 (i.e., parameter on the number of CBGs) are each configured, at least using a granularity coarser than a granularity of a CBG unit.

Upon reception of the DCI and DL data in ST102, terminal 200 generates HARQ-ACKs for respective CBGs for the DL data based on DAIs respectively contained in a plurality of DCIs indicated by base station 100 (ST103) and transmits the generated HARQ-ACKs collectively to base station 100 (ST104).

Definition of DAI

Next, a description will be given of the definition of a DAI according to Embodiment 1.

In Embodiment 1, the number of bits of an index (DAI index) in a DAI and a DAI value are configured, using the maximum number of CBGs to be assigned by a single DL assignment (hereinafter, may be referred to as "X"), the number of consecutive DCI decoding errors (the allowable number of times a DCI decoding error occurs in a row) (hereinafter, may be referred to as "Y"), and a granularity of a DAI value (hereinafter, may be referred to as "Z").

Note that, the term "maximum" used in the maximum number of CBGs refers to the maximum number of CBGs configured for each terminal 200 by base station 100, not the maximum number of CBGs in the specification.

The counter DAI and total DAI forming a DAI are defined as follows.

Counter DAI: cumulative number of CBGs
Total DAI: total number of CBGs

The number of bits of a DAI is determined as follows. Note that, in a case where the number of bits that is less than the number of bits to be determined is configured as follows, there is a possibility that terminal 200 wrongly recognizes a DAI value.

$\text{Ceiling}(\log_2(X*(Y+1))/Z)$

A DAI index and a DAI value (cumulative number of CBGs, a value interpreted as a total number) are associated with each other based on the number of bits of a DAI. More specifically, when the number of DAI indices increases by one, the DAI value increases by a granularity of Z. In addition, as in the definition of DAI in LTE, a plurality of DAI values are associated with each DAI index in Embodiment 1. More specifically, DAI values (candidate values) associated with each DAI index "i" are determined by the following expression.

$((i+1) \bmod N_{index})*Z+X*(Y+1)*j$, where

"i"=0, 1, . . . , $N_{index}-1$,
"$N_{index}$": the number of DAI indices ($2^{\{\text{ceiling}(\log_2((X*(Y+1))/Z))\}}$) and
"j"=0, 1, 2, and so forth.

More specifically, $N_{index}$ DAI indices "i" in a number smaller than the number of the plurality of candidate values are cyclically (i.e., j=0, 1, 2, . . . ) provided to the plurality of candidate values for DAI.

Hereinafter, a description will be given of a DAI of a case where the maximum number of CBGs, "X," is equal to 8, and the number of consecutive DCI decoding errors, "Y," is 3, as an example.

FIG. 6 illustrates a table for DAIS (relationship between DAI indices and DAI values) of a case where granularity Z=1, and FIG. 7 illustrates a table for DAIS (relationship between DAI indices and DAI values) of a case where granularity Z=4.

In a case where granularity Z=1 in FIG. 6, as the DAI index i increases by one, the DAI value increases by one (i.e., by the amount of granularity Z). Accordingly, the maximum number of CBGs, X, is equal to 8, and in a case where three consecutive DCI decoding errors are allowed (Y=3), the DAI value is defined to be 5 bits (8*4=32→5 bits).

Meanwhile, in a case where granularity Z=4 in FIG. 7, as the DAI index i increases by one, the DAI value increases by four (i.e., by the amount of granularity Z). Accordingly, the maximum number of CBGs, X, is equal to 8, and in a case where three consecutive DCI decoding errors are allowed (Y=3), the DAI value is defined to be 3 bits (8*4/4=8→3 bits).

Accordingly, as illustrated in FIG. 7 (granularity Z=4), configuring a DAI using a granularity coarser than a case where granularity Z=1 illustrated in FIG. 6 (i.e., the granularity of a CBG unit) reduces the number of bits of a DAI by 2 bits as compared with the case in FIG. 6, and thus can reduce the DCI overhead.

DAI generator 102 of base station 100 calculates a counter DAI (cumulative number of CBGs) and a total DAI (total number of CBGs) according to the definition described above, based on the maximum number of CBGs, X, the allowable number of consecutive DCI decoding errors (the allowable number of times a reception error occurs, the granularity Z of DAI, a passed DL data transmission history in a bundling window, and current DL data scheduling information.

Note that, in a case where a DAI of granularity Z (e.g., Z=4 in FIG. 7) which is coarser than the granularity of a CBG unit (i.e., granularity Z=1), there is a case where the cumulative number of CBGs (or total number of CBGs) does not match the DAI value. In this case, as the DAI value, a DAI value closest to the cumulative number of CBGs may be selected from among DAI values each satisfying "cumulative number of CBGs (or total number of CBGs)<DAI value." In the definition of DAI illustrated in FIG. 7, when the cumulative number of CBGs is 10, 12 is selected as the DAI value, for example. Note that, as long as the understanding of the cumulative number of CBGs is the same between base station 100 and terminal 200, the cumulative number of CBGs may be a value containing the number of CBGs of the currently-received data or may be a value not containing this number. The cumulative number of CBGs is described herein as a value containing the number of CBGs of the currently-received data.

DAI Determination Method

Next, a DAI determination method in DAI determiner 207 of terminal 200 will be described.

DAI determiner 207 of terminal 200 determines the cumulative number of CBGs based on a counter DAI index indicated from base station 100. More specifically, terminal 200 holds the latest counter DAI value indicated in the past in a bundling window. Terminal 200 determines, using the indicated DAI index and the latest counter DAI value held in terminal 200, a closest DAI value which satisfies "DAI value associated with DAI index>held counter DAI value," to be the cumulative number of CBGs (the number of HARQ-ACK bits).

In DAIS illustrated in FIG. 7, in a case where the counter DAI value held by terminal 200 is "48," and the DAI index indicated from base station 100 is "101," for example, terminal 200 determines, from among the DAI values associated with the DAI index "101" (24 or 56 or so forth), the DAI value "56," which is larger than the DAI value "48" and closest to the DAI value, to be the cumulative number of CBGs (the number of HARQ-ACK bits). Note that, in a case where there is no counter DAI value held by terminal 200, the very first DAI value (the smallest value, and "24" in case of DAI index "101" described above) in the indicated DCI index is selected as the cumulative number of CBGs.

Moreover, DAI determiner 207 of terminal 200 determines the total number of CBGs based on a total DAI index indicated from base station 100. More specifically, terminal 200 determines a value which satisfies "DAI value associated with a total DAI index≥held counter DAI value" and which is closest to the DAI value to be the total number of CBGs (HARQ-ACK codebook size).

In DAIS illustrated in FIG. 7, in a case where the counter DAI value held by terminal 200 is "48," and the DAI index indicated from base station 100 is "101," for example, terminal 200 determines, from among the DAI values associated with DAI index "101" (24 or 56 or so forth), the DAI value "56," which is larger than the DAI value "48," and which is closest to the DAI value, to be the total number of CBGs (HARQ-ACK codebook size).

Note that, terminal 200 may determine the total number of CBGs while including the number of CBGs by data reception or the like where no DAI is indicated as in Semi-Persistent Scheduling (SPS), in determination of the total number of CBGs.

HARQ-ACK Generation Method

Next, a HARQ-ACK generation method in HARQ-ACK generator 208 of terminal 200 will be described.

HARQ-ACK generator 208 of terminal 200 generates a HARQ-ACK bit based on received data (error detection result), a cumulative number of CBGs, and a total number of CBGs.

More specifically, terminal 200 generates a HARQ-ACK bit sequence such that the number of bits obtained by concatenating together an already generated HARQ-ACK bit sequence (HARQ-ACK bit sequence generated in the past in bundling window) and a HARQ-ACK bit sequence of currently-received data (data received this time) matches the cumulative number of CBGs.

Figure 8:
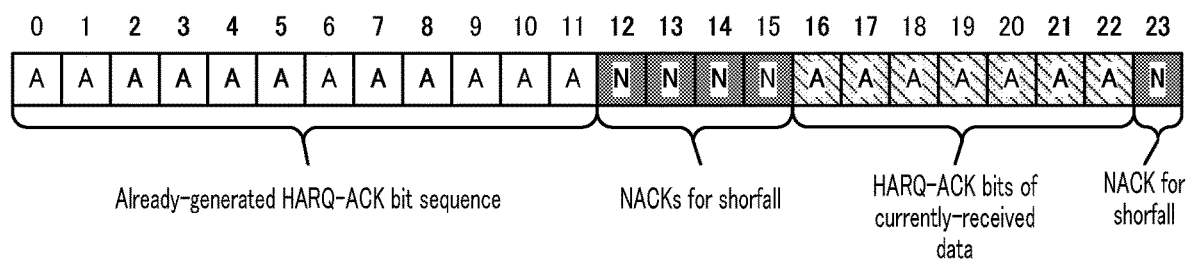
FIG. 8 is a diagram illustrating an example of how a HARQ-ACK bit is generated according to Embodiment 1.

FIG. 8 illustrates an example of generating a HARQ-ACK in a case where the number of already-generated HARQ-ACK bits is 12 bits, the number of HARQ-ACK bits of currently-received data is 7 bits, and the cumulative number of CBGs is 24. Moreover, the DAI illustrated in FIG. 7 is defined.

Terminal 200 first subtracts the number of HARQ-ACK bits of currently-received data (7 bits in FIG. 8) from the cumulative number of CBGs (24 in FIG. 8), and rounds off the number of bits which is the result of subtraction (24−7=17) in accordance with a possible DAI value (16 bits in FIGS. 7 and 8).

In a case where the number of bits thus obtained (16 bits) is greater than the number of already-generated HARQ-ACK bits (12 bits in FIG. 8) (such as a case where a DCI decoding error occurs), terminal 200 then adds a NACK corresponding to the number of missing bits with respect to the number of already-generated HARQ-ACK bits (16 bits−12 bits=4 bits in FIG. 8) to a position subsequent to the already-generated HARQ-ACK bit sequence (16 bits in total). Thus, terminal 200 can generate a HARQ-ACK bit for a slot in which a DCI decoding error has occurred.

Terminal 200 then adds the HARQ-ACK bits of currently-received data (7 bits in FIG. 8) (23 bits in total). In a case where the number of bits resulting from addition of the HARQ-ACK bits of currently-received data (23 bits in FIG. 8) is short of the cumulative number of CBGs (24), terminal 200 further adds a NACK corresponding to the number of shortfall bits (1 bit in FIG. 8).

Terminal 200 adds a NACK bit for the shortfall in a case where the number of bits is short of the cumulative number of bits even after addition of HARQ-ACK bits of all the received data in a bundling window (not illustrated).

Next, a specific operation example of DAI indication and HARQ-ACK generation according to Embodiment 1 will be described.

Figure 9:
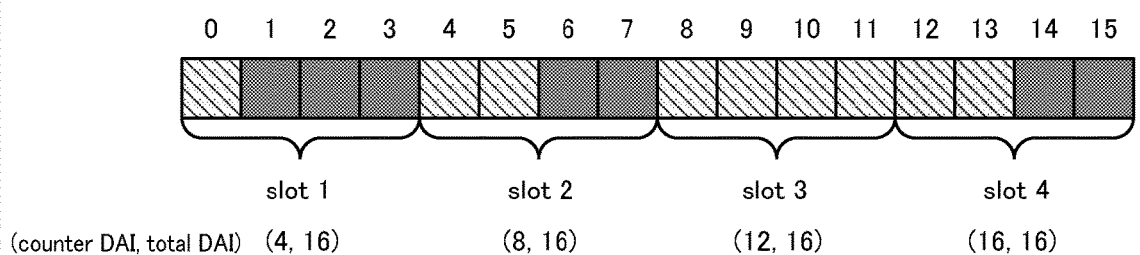
FIG. 9 is a diagram illustrating an example of HARQ-ACK transmission processing according to Embodiment 1.

FIG. 9 illustrates an example of generating a HARQ-ACK in a case where a 3-bit DAI with granularity Z=4 as illustrated in FIG. 7 is used.

In FIG. 9, the numbers of CBGs of DL data assigned to terminal 200 in slots 1 to 4 are configured with one CBG, two CBGs, four CBGs, and two CBGs, respectively. In other words, a HARQ-ACK for nine CBGs is generated in terminal 200.

Base station 100 (DAI generator 102) configures the DAI values of counter DAIs in the slots with 4, 8, 12, and 16, respectively, as in the DAI determination method described above since the numbers of CBGs in the slots are one CBG, two CBGs, four CBGs, and two CBGs, respectively. Furthermore, base station 100 configures the DAI value of the total DAI in each of slots 1 to 4 with "16" based on granularity Z=4 as illustrated in FIG. 7 since the numbers of CBGs to be transmitted in slots 1 to 4 are one CBG, two CBGs, four CBGs, and two CBGs, respectively. Thus, the DAIs (counter DAI, total DAI) to be transmitted in slots 1 to 4 are configured to be (4, 16), (8, 16), (12, 16), and (16, 16), respectively.

As described with FIG. 8, terminal 200 (HARQ-ACK generator 208) generates HARQ-ACK bit sequences for respective CBGs (nine CBGs in FIG. 9), which are reception results of DL data (one CBG, two CBGs, four CBGs, and two CBGs) in the respective slots, based on the received DAI values.

As illustrated in FIG. 9, however, since the counter DAI of slot 1 is equal to four, terminal 200 adds 3 padding bits (e.g., NACK bits) for the shortfall to a 1-bit HARQ-ACK bit sequence for data of one CBG in slot 1. Likewise, as illustrated in FIG. 9, the counter DAI of slot 2 is equal to eight, terminal 200 adds 2 padding bits (e.g., NACK bits) for the shortfall to a 6-bit HARQ-ACK bit sequence in slots 1 and 2. Moreover, as illustrated in FIG. 9, terminal 200 generates a 4-bit HARQ-ACK bit sequence for data of four CBGs in slot 3. Since the counter DAI of slot 3 is equal to 12, and a total of the HARQ-ACK bit sequences in slots 1 to 3 is 12 bits, no padding bit is added, however. Furthermore, as illustrated in FIG. 9, since the counter DAI of slot 4 is equal to 16, terminal 200 adds 2 padding bits (e.g., NACK bits) for the shortfall to a 14-bit HARQ-ACK bit sequence in slots 1 to 4.

In the manner described above, as illustrated in FIG. 9, terminal 200 generates a 16-bit HARQ-ACK bit sequence for nine CBGs in a bundling window. Terminal 200 collectively transmits a 16-bit HARQ-ACK bit sequence to base station 100.

Base station 100 (HARQ-ACK determiner 111) determines a reception result of each CBG in terminal 200 based on a HARQ-ACK bit sequence contained in a UCI, in accordance with the definition of HARQ-ACK as in terminal 200.

As described above, in Embodiment 1, a DAI (counter DAI and total DAI) configured, at least using a granularity coarser than a granularity in units of CBGs is indicated from base station 100 to terminal 200. Thus, as compared with a case where a DAI is indicated for each CBG, the number of bits required for indication of a DAI can be reduced. In other words, according to Embodiment 1, retransmission control for each CBG can be performed while an increase in the DCI overhead is suppressed.

Embodiment 2

Note that, a base station and a terminal according to Embodiment 2 include basic configurations common to base station 100 and terminal 200 according to Embodiment 1, so that a description will be given while FIGS. 3 and 4 are incorporated herein.

In the DAI configuration method described in Embodiment 1, while the DCI overhead (the number of DAI bits) can be reduced, the UCI (HARQ-ACK bit) overhead may increase because of configuring the granularity (Z) to be coarser.

Figure 10:
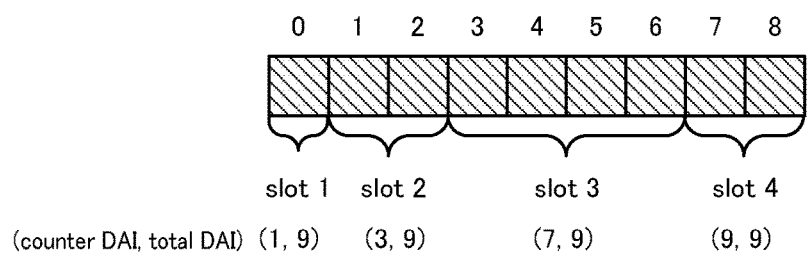
FIG. 10 is a diagram illustrating an example of HARQ-ACK transmission processing according to Embodiment 2.

FIG. 10 illustrates, an example of generating a HARQ-ACK in a case where a 5-bit DAI with Z=1, which is a granularity finer than the DAI configuration (granularity Z=4) illustrated in FIG. 9 described in Embodiment 1 (e.g., see, FIG. 6) is used, for example. More specifically, in FIG. 10, a DAI is configured with a granularity of a CBG unit.

In FIG. 10, as in FIG. 9, the numbers of CBGs of DL data assigned to terminal 200 in slots 1 to 4 are configured with one CBG, two CBGs, four CBGs, and two CBGs, respectively. More specifically, a HARQ-ACK for nine CBGs is generated in terminal 200.

Base station 100 configures the DAI values of counter DAIS in the slots with 1, 3, 7, and 9, respectively, since the numbers of CBGs in the slots are one CBG, two CBGs, four CBGs, and two CBGs, respectively. Furthermore, base station 100 configures the DAI value of the total DAI in each of slots 1 to 4 with "9" since the numbers of CBGs to be transmitted in slots 1 to 4 are one CBG, two CBGs, four CBGs, and two CBGs, respectively. Thus, the DAIS (counter DAI, total DAI) to be transmitted in slots 1 to 4 are configured to be (1, 9), (3, 9), (7, 9), and (9, 9), respectively.

Furthermore, in the case of FIG. 10, terminal 200 generates HARQ-ACK bit sequences for respective CBGs (nine CBGs in FIG. 9), which are reception results of DL data (one CBG, two CBGs, four CBGs, and two CBGs) in the respective slots, based on the received DAI values. Thus, in FIG. 10, terminal 200 collectively transmits a 9-bit HARQ-ACK bit sequence for nine CBGs in the bundling window to base station 100.

FIG. 9 (granularity Z=4) and FIG. 10 (granularity Z=1) are compared with each other herein.

In FIG. 9, the number of DAI bits is 3 bits, while the number of bits of the HARQ-ACK bit sequence is 16 bits. Meanwhile, in FIG. 10, the number of DAI bits is 5 bits, while the number of bits of the HARQ-ACK bit sequence is 9 bits. More specifically, in a case where the granularity of DAI is made coarse, the DCI overhead can be reduced, but the UCI overhead increases. In other words, there is a trade-off relationship between the DCI overhead and the UCI overhead with respect to the granularity of DAI.

In this respect, a description will be given of a case where the configuration of the granularity of DAI is changeable. Base station 100, for example, configures (indicates to) terminal 200 with the granularity (Z) of DAI, using RRC signaling, based on scheduling information and/or the like.

Scheduler 101 of base station 100 configures the granularity of DAI based on the scheduling information for terminal 200. Scheduler 101 outputs the information indicating the configured granularity of DAI to DAI generator 102.

The impact of an increase in the UCI overhead is small, for example, in a case where a UCI resource is sufficiently allocated for terminal 200 or a case where no wide coverage is required for terminal 200 (as the UCI overhead increases, the coding rate becomes higher and the coverage decreases, but such a decrease in coverage involves no problem because of cell mapping or user position, for example). Accordingly, in these cases, base station 100 may configure terminal 200 with a coarse granularity of DAI (e.g., DAI of granularity Z=4 illustrated in FIG. 7).

Meanwhile, the impact of an increase in the UCI overhead is large in a case where no UCI resource is sufficiently allocated for terminal 200 or a case where a wide coverage is required for terminal 200. Accordingly, in these cases, base station 100 may configure terminal 200 with a fine granularity of DAI (e.g., DAI of granularity Z=1 illustrated in FIG. 6).

The configured granularity of DAI is indicated to terminal 200 from base station 100.

DAI generator 102 of base station 100 generates a DAI based on the granularity Z configured in scheduler 101.

Meanwhile, DAI determiner 207 of terminal 200 performs determination of a DAI based on the granularity indicated by base station 100. In other words, DAI determiner 207 identifies a DAI value (counter DAI or total DAI) corresponding to the indicated DAI index based on the configuration of the indicated granularity and generates a HARQ-ACK bit sequence based on the identified DAI.

As described above, according to Embodiment 2, the granularity of a DAI can be configured based on whether or not the condition is one that has a small impact even when the UCI overhead increases, for example. Thus, the DCI overhead can be reduced while the impact of an increase in the UCI overhead attributable to configuring the granularity of a DAI to be coarser is reduced.

Note that, the granularity of a DAI may be implicitly indicated in accordance with another parameter without being limited to a case where the granularity of a DAI is configured by RRC signaling (explicit signaling) from base station 100 to terminal 200. Hereinafter, a configuration example (variation) of the granularity of a DAI in terminal 200 will be described.

Configuration Example 1: Number of Connected Cells

In a case where the number of cells to which terminal 200 is connected (the number of connected cells) is large, the HARQ-ACK codebook size becomes large, and the impact of an increase in the UCI overhead becomes large. In this respect, a DAI of a fine granularity (e.g., Z=1 in FIG. 6) may be configured in a case where the number of connected cells of terminal 200 is equal to or greater than a threshold, and a DAI of a coarse granularity (e.g., Z=4 in FIG. 7) may be configured in a case where the number of connected cells of terminal 200 is less than a threshold. Thus, in a case where the number of cells to which terminal 200 is connected is large, an increase in the UCI overhead can be suppressed.

Configuration Example 2: Maximum Number of CBGs

In a case where the number of CBGs assigned to terminal 200 is large, the number of bits of a DAI increases. In this respect, a DAI of a coarse granularity (e.g., Z=4 in FIG. 7) may be configured in a case where the number of CBGs is equal to or greater than a threshold, and a DAI of a fine granularity (e.g., Z=1 in FIG. 6) may be configured in a case where the number of CBGs is less than a threshold. Thus, in a case where the number of CBGs assigned to terminal 200 is large, the DAI overhead (the number of bits) can be reduced by using a DAI of a coarse granularity.

Configuration Example 3: TDD Configuration

In TDD configuration, the impact of an increase in the UCI overhead is small in a case where the UL resource is large. In this respect, a DAI of a coarse granularity (e.g., Z=4 in FIG. 7) may be configured in a case where the UL resource amount at the time of TDD configuration is equal to or greater than a threshold, and a DAI of a fine granularity (e.g., Z=1 in FIG. 6) may be configured in a case where the UL resource amount at the time of TDD configuration is less than a threshold. Thus, the DCI overhead can be reduced while the impact of an increase in the UCI overhead is suppressed in a case where the UL resource amount is large at the time of TDD configuration.

Configuration Example 4: Service Type

As a service type, URLLC requires an increase in reliability, and a decrease in UCI coding rate is not favorable, for example. In this respect, a DAI of a fine granularity (e.g., Z=1 in FIG. 6) may be configured in a case where the service type for terminal 200 is URLLC, and a DAI of a coarse granularity (e.g., Z=4 in FIG. 7) may be configured in a case where the service type for terminal 200 is a type other than URLLC (e.g., eMBB). Thus, the reliability of UCI is maintained in the case of URLLC, and the DCI overhead can be reduced in a service type other than URLLC, for example.

Configuration Examples 1 to 4 have each been described thus far. As described above, the granularity of a DAI is changed in accordance with the number of connected cells of terminal 200, the number of CBGs assigned to terminal 200, TDD configuration, or a service type of terminal 200.

DAI generator 102 of base station 100 implicitly determines the granularity of a DAI according to the configuration examples and generates a DAI. Moreover, DAI determiner 207 of terminal 200 implicitly determines the granularity of a DAI according to the configuration examples and determines a DAI.

As described above, base station 100 and terminal 200 no longer require signaling for indicating the granularity of a DAI, by configuring the granularity of a DAI based on a parameter configured for terminal 200.

Note that, the basis for changing the granularity of a DAI is not limited to the above-mentioned cases. As described above, the granularity of a DAI may be adaptively configured based on a parameter having an impact on the UCI coverage, the UL resource, the UCI coding rate, and/or the like, for example.

Embodiment 3

Note that, a base station and a terminal according to Embodiment 3 include basic configurations common to base station 100 and terminal 200 according to Embodiment 1, so that a description will be given while FIGS. 3 and 4 are incorporated herein.

In Embodiment 3, a description will be given of a case where the granularity Z of a DAI value is changed between DAI indices, or between different cycles of the same DAI index (corresponding to "j" in the expression for calculating a DAI value in Embodiment 1).

The DAI value, however, needs to be configured to satisfy the following condition. In a case where the following condition is not satisfied, there is a possibility that terminal 200 wrongly interprets the DAI value.

Difference in DAI value between cycles$\geq X^*(Y+1)$, where

X: Maximum number of CBGs and

Y: Number of consecutive DCI decoding errors.

FIG. 11 illustrates a table for DAIs (relationship between DAI indices and DAI values) according to Embodiment 3. In FIG. 11, the maximum number of CBGs, X, is set equal to 8, and the number of consecutive DCI decoding errors, Y, is set equal to 3.

In FIG. 11, the granularity Z=2, 4, and 8 is present in DAI values (=0, 2, 4, 6, 8, 12, 20, and 28) of the first cycle (corresponding to j=0), and the granularity Z is equal to 4 and fixed in DAI values (=32, 36, 40, 44, 48, 52, 56, and 60) of the second cycle (corresponding to j=1).

More specifically, in the first cycle illustrated in FIG. 11, the granularity Z of a DAI value (candidate value) differs between different combinations of consecutive DAI indice (e.g., combination of "000" and "001" (Z=2), combination of "011" and "100" (Z=4), and combination of "101" and "110" (Z=8)).

Furthermore, in consecutive DAI indices, the granularity of DAI values (candidate values) in the first cycle and the granularity of DAI values in the second cycle are different. In a combination of DAI indices "000" and "001," for example, the granularity of DAI values in the first cycle is two, and the granularity of DAI values in the second cycle is four.

In addition, as described above, the difference in DAI values between the cycles of the same DAI index (between the first and the second cycles in FIG. 11) is at least 32 (=8*(3+1)) and satisfies the above condition.

The DAI pattern illustrated in FIG. 11, for example, assumes an application of reducing the UCI overhead in a case where the number of HARQ-ACK bits is small. In other words, the DAIS illustrated in FIG. 11, for example, reduce the number of bits of a HARQ-ACK bit sequence by the amount corresponding to the fact that the granularity of a DAI values includes a coarse range, as compared with the DAIS illustrated in FIG. 7 (the granularity Z is equal to 4 and fixed), and can reduce the UCI overhead.

Note that, base station 100 and terminal 200 perform processing similar to the processing in Embodiment 1. More specifically, DAI generator 102 of base station 100, for example, generates a DAI based on the granularity Z defined as in FIG. 11. Furthermore, DAI determiner 207 of terminal 200, for example, determines a DAI based on the granularity Z defined as in FIG. 11, and HARQ-ACK generator 208, for example, generates a HARQ-ACK bit sequence based on the granularity Z defined as in FIG. 11.

Next, a specific operation example of DAI indication and HARQ-ACK generation according to Embodiment 3 will be described.

Figure 12:
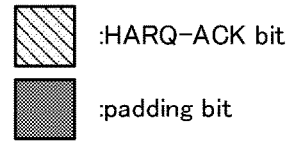
FIG. 12 is a diagram illustrating a comparison example of HARQ-ACK transmission processing according to Embodiment 3.
Figure 12:
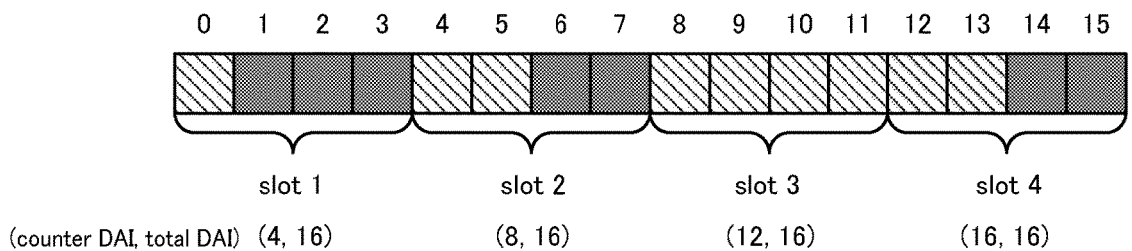
Figure 12:
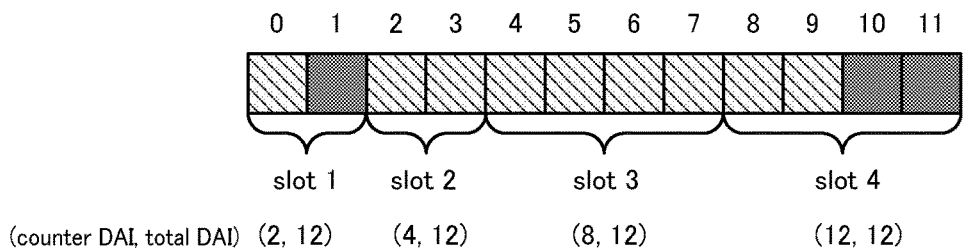

FIG. 12 illustrates an example of generating a HARQ-ACK in a case where 3-bit DAIS with granularity Z=4 as illustrated in FIG. 7 of Embodiment 1 are used (Configuration 1) and in a case where DAIS illustrated in FIG. 11 of Embodiment 3 are used (Configuration 2), for example.

In FIG. 12, the numbers of CBGs of DL data assigned to terminal 200 in slots 1 to 4 are set to one CBG, two CBGs, four CBGs, and two CBGs, respectively. In other words, a HARQ-ACK for nine CBGs is generated in terminal 200.

In Config. 1, as described in Embodiment 1, the DAIS (counter DAI and total DAI) to be transmitted in slots 1 to 4 are configured with (4, 16), (8, 16), (12, 16), and (16, 16), respectively. Moreover, terminal 200 collectively transmits a 16-bit HARQ-ACK bit sequence for nine CBGs in the bundling window to base station 100.

Meanwhile, in Config. 2, since the numbers of CBGs in the slots are one CBG, two CBGs, four CBGs, and two CBGs, respectively, base station 100 (DAI generator 102) configures the DAI values of the counter DAIS of the respective slots with 2, 4, 8, and 12, respectively, based on the granularity of DAIS illustrated in FIG. 11. Furthermore, since the numbers of CBGs to be transmitted in four slots 1 to 4 are one CBG, two CBGs, four CBGs, and two CBGs, respectively, base station 100 configures the DAI value of the total DAI in each of slots 1 to 4 with "12" based on the granularity of DAIS illustrated in FIG. 11. Thus, the DAIS (counter DAI, total DAI) to be transmitted in slots 1 to 4 are configured to be (2, 12), (4, 12), (8, 12), and (12, 12), respectively.

In Config. 2, terminal 200 (HARQ-ACK generator 208) generates HARQ-ACK bit sequences for respective CBGs (nine CBGs in FIG. 12), which are reception results of DL data (one CBG, two CBGs, four CBGs, and two CBGs) in the respective slots, based on the received DAI values.

As illustrated in FIG. 12, however, since the counter DAI of slot 1 is equal to two, terminal 200 adds a 1 padding bit (e.g., NACK bit) for the shortfall to 1-bit HARQ-ACK bit sequence for data of one CBG in slot 1. Moreover, as illustrated in FIG. 12, terminal 200 generates a 2-bit HARQ-ACK bit sequence for data of two CBGs in slot 2. Since the counter DAI of slot 2 is equal to four, and a total of the HARQ-ACK bit sequences in slots 1 and 2 is 4 bits, no padding bit is added, however. Likewise, terminal 200 generates a 4-bit HARQ-ACK bit sequence for data of two CBGs in slot 3 (no padding bit is added). Moreover, as illustrated in FIG. 12, since the counter DAI of slot 4 is equal to 12, terminal 200 adds 2 padding bits (e.g., NACK bits) for the shortfall to a 10-bit HARQ-ACK bit sequence in slots 1 to 4.

As described above, in FIG. 12, terminal 200 collectively transmits a 12-bit HARQ-ACK bit sequence for nine CBGs in the bundling window to base station 100.

In FIG. 12, in Config. 2 according to Embodiment 3, the number of HARQ-ACK bits is reduced by 4 bits while the number of bits for DAIs is the same (3 bits), as compared with Config. 1 (case where granularity is fixed to four). In other words, the UCI overhead can be reduced by 4 bits.

Note that, although the case where the granularity of the DAI values of the first cycle is configured to differ is described in FIG. 11, without limitation to this case, the granularity of the DAI values of the second cycle may be configured to differ.

As described above, according to Embodiment 3, an increase in the UCI overhead can be reduced while the DCI overhead is reduced by changing the granularity of a DAI according to a DAI index or cycle.

Each embodiment of the present disclosure has been described thus far.

Other Embodiments (1) In the embodiments described above, a description has been given of the case where the granularities of DAI values of a counter DAI and total DAI are the same, but the granularities of DAI values of a counter DAI and total DAI (or DAI generation methods) may be different from each other. In this case, the granularities of the counter DAI and total DAI (or DAI generation methods) are individually configured and generation and determination of DAI values are individually performed in base station 100 and terminal 200. Even when the value of the granularity differs between the counter DAI and total DAI, the HARQ-ACK bit generation method is the same as the method described in Embodiment 1.

A padding bit by the total DAI (NACK bit to be added because the number of HARQ-ACK bits thus generated does not match the DAI value), for example, occurs once in the last in the bundling window. In this respect, configuring the granularity of the total DAI to be coarse with respect to the granularity of the counter DAI makes it possible to suppress an increase in the number of padding bits to be added and also to achieve the UCI overhead reduction.

Figure 13:
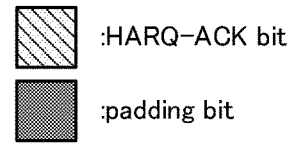
FIG. 13 is a diagram illustrating a comparison example of HARQ-ACK transmission processing according to another embodiment.
Figure 13:
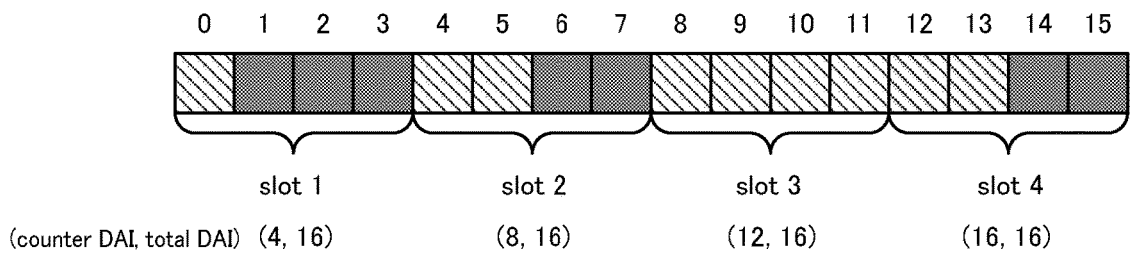
Figure 13:
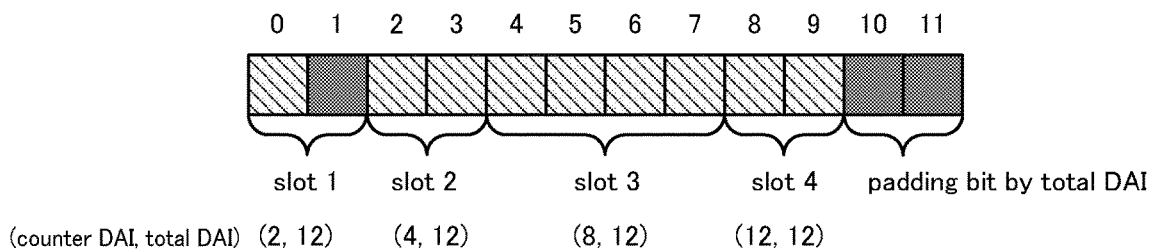

FIG. 13 illustrates an operation example of generating a HARQ-ACK bit in a case where the granularity (granularity, Z=4) of a counter DAI and total DAI uses a 3-bit DAI (Config. 3) and in a case where DAIS are used in which the granularity of the counter DAI is configured to be two (4 bits) and the granularity of the total DAI is configured to be four (3 bits) (Config. 4), for example.

In Config. 3, the number of bits of the counter DAI and total DAI forming a DAI to be transmitted in each of slots 1 to 4 is 6 bits in total, and the number of bits of a HARQ-ACK bit sequence generated for nine CBGs in the bundling window is 16 bits.

Meanwhile, in Config. 4, the number of bits of the counter DAI and total DAI forming a DAI to be transmitted in each of slots 1 to 4 is 7 bits in total, and the number of bits of a HARQ-ACK bit sequence generated for nine CBGs in the bundling window is 12 bits.

More specifically, although the DCI overhead increases by 1 bit, the UCI overhead can be reduced by four bits in Config. 4 as compared with Config. 3. In other words, the UCI overhead can be reduced while an increase in the DCI overhead is suppressed.

(2) A total DAI may contain the number of HARQ-ACKs of a DL data reception result by SPS.

(3) In the embodiments described above, a description has been given of the case where a counter DAI and a total DAI are both indicated to terminal 200 from base station 100. The total DAI may not be indicated, however. A HARQ-ACK codebook size, for example, may be indicated by a method other than the total DAI or may be known to terminal 200.

(4) The values of granularity Z described in the embodiments (e.g., Z=1, 2, 4, 6, and 8) are only exemplary and may be a value other than these values. As a value of granularity Z, for example, any value between granularity 1 of a CBG unit and the granularity of a TB unit may be configured.

(5) The higher-layer signaling may be replaced with MAC signaling. In case of MAC signaling, indication to terminal 200 can be made more often as compared with RRC signaling.

(6) Embodiments 1 to 3 may be applied alone or in combination of a plurality of embodiments.

(7) The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

A terminal according to the present disclosure includes: circuitry, which, in operation, generates one or more response signals for respective code block groups based on a parameter included in each of a plurality of downlink control signals, the code block groups forming each of a plurality of transport blocks to be assigned by the plurality of downlink control signals, the parameter relating to the number of the code block groups; and a transmitter, which in operation, collectively transmits the response signals for the respective code block groups, in which a value of the parameter is to be configured, at least using a first granularity coarser than a second granularity in units of the code block groups.

In the terminal according to the present disclosure, the value of the parameter is to be configured, using the first granularity, the number of code block groups within the transport block, and the number of times a demodulation error for the downlink control signal is allowed.

In the terminal according to the present disclosure, the first granularity is changeable.

In the terminal according to the present disclosure, the first granularity is indicated to the terminal from a base station.

In the terminal according to the present disclosure, the first granularity is changed in accordance with at least one of: the number of cells to which the terminal is to be connected; the number of code block groups to be assigned to the terminal; time division duplex (TDD) configuration; and a service type of the terminal.

In the terminal according to the present disclosure, an index is provided to a plurality of candidate values for the parameter, and the first granularity differs between different combinations of the indices which are consecutive.

In the terminal according to the present disclosure, one or more indices are cyclically provided to a plurality of candidate values for the parameter, the number of the indices being smaller than the number of the plurality of candidate values, and the first granularity in a first cycle of the candidate values and the first granularity in a second cycle of the candidate values are different from each other in a combination of the indices which are consecutive.

In the terminal according to the present disclosure, the parameter indicates a cumulative number of the code block groups and a total number of the code block groups, and the first granularity for the cumulative number and the first granularity for the total number are different from each other.

A communication method according to the present disclosure includes: generating one or more response signals for respective code block groups based on a parameter included in each of a plurality of downlink control signals, the code block groups forming each of a plurality of transport blocks to be assigned by the plurality of downlink control signals, the parameter relating to the number of the code block groups; and collectively transmitting the response signals for the respective code block groups, in which a value of the parameter is to be configured, at least using a first granularity coarser than a second granularity in units of the code block groups.

INDUSTRIAL APPLICABILITY

An aspect of this disclosure is useful in mobile communication systems.

REFERENCE SIGNS LIST

100 Base station
101 Scheduler
102 DAI generator
103 DCI generator
104 DCI encoder/modulator
105 Data encoder/modulator
106, 210 Signal assigner
107, 211 Transmitter
108, 201 Receiver
109, 202 Signal demultiplexer
110 UCI demodulator/decoder
111 HARQ-ACK determiner
200 Terminal
203 Data demodulator/decoder
204 Data error detector
205 DCI demodulator/decoder 206 DCI error detector
207 DAI determiner
208 HARQ-ACK generator
209 Encoder/modulator

The invention claimed is:

1. A terminal comprising:
circuitry, which, in operation, generates one or more response signals, for each code block group of code block groups, based on a parameter included in each of a plurality of downlink control signals, the code block groups forming each of a plurality of transport blocks to be assigned by the plurality of downlink control signals, the parameter relating to a number of the code block groups; and
a transmitter, which in operation, collectively transmits the response signals for the code block groups, wherein
a value of the parameter is configured at least using a first granularity coarser than a second granularity in units of the code block groups and a number of times a demodulation error for a downlink control signal is allowed.

2. The terminal according to claim 1, wherein the value of the parameter is configured using a number of code block groups within a transport block.

3. The terminal according to claim 1, wherein the first granularity is changeable.

4. The terminal according to claim 3, wherein the first granularity is indicated to the terminal from a base station.

5. The terminal according to claim 3, wherein the first granularity is changed in accordance with at least one of: a number of cells to which the terminal is to be connected; a number of code block groups to be assigned to the terminal; time division duplex (TDD) configuration; and a service type of the terminal.

6. The terminal according to claim 1, wherein
an index is provided to a plurality of candidate values for the parameter, and
the first granularity differs between different combinations of the indices which are consecutive.

7. The terminal according to claim 1, wherein
one or more indices are cyclically provided to a plurality of candidate values for the parameter, the number of the indices being smaller than the number of the plurality of candidate values, and
the first granularity in a first cycle of the candidate values and the first granularity in a second cycle of the candidate values are different from each other in a combination of the indices which are consecutive.

8. The terminal according to claim 1, wherein
the parameter indicates a cumulative number of the code block groups and a total number of the code block groups, and
the first granularity for the cumulative number and the first granularity for the total number are different from each other.

9. A communication method comprising:
generating one or more response signals, for each code block group of code block groups, based on a parameter included in each of a plurality of downlink control signals, the code block groups forming each of a plurality of transport blocks to be assigned by the plurality of downlink control signals, the parameter relating to a number of the code block groups; and
collectively transmitting the response signals for the code block groups, wherein
a value of the parameter is configured at least using a first granularity coarser than a second granularity in units of the code block groups and a number of times a demodulation error for a downlink control signal is allowed.

* * * * *